United States Patent Office 3,492,270
Patented Jan. 27, 1970

3,492,270
CROSSLINKED POLYAMIDE-ACID AND POLYIMIDE POLYMERS
Darrell J. Parish, Circleville, Ohio, assignor to E. I. du Pont de Nemours and Company, Wilmington, Del., a corporation of Delaware
No Drawing. Continuation-in-part of application Ser. No. 546,540, May 2, 1966. This application Jan. 21, 1969, Ser. No. 792,789
Int. Cl. C08g 20/00, 20/32
U.S. Cl. 260—47      4 Claims

ABSTRACT OF THE DISCLOSURE

Crosslinked polymers are provided of polyamide-acid and polyimides characterized by a carbonyl crosslink and useful as coatings, enamels, adhesives and the like.

---

The present invention is a continuation-in-part of copending application Ser. No. 546,540 filed on May 2, 1966, now abandoned.

This invention relates to polyamide-acid and polyimide polymers.

According to the present invention, there are provided novel crosslinked polymer products formed by reaction of a class of aromatic polyamide-acids and polyimides with a class of selected polyfunctional carboxylic acids and their derived lower alkyl or phenyl esters, acid chlorides, anhydrides, and derivatives of mixed functionality.

The properties of the final crosslinked polymer renders it particularly suitable to meet specific end uses without substantial loss of the desirable mechanical, electrical, thermal and other qualities of the polyamide-acids and polyimides. For example, the crosslinked product adds desired rigidity to finished products in such applications as adhesives, coatings, etc.

The polyamide-acids which can advantageously be crosslinked according to the present invention contain the following recurring structural units:

(1)
$$\left[ \begin{array}{c} R'OOC \diagdown \diagup COOR^5 \\ R \\ -NH-C \diagup \diagdown C-NH-R^1- \\ \parallel \phantom{xx} \parallel \\ O \phantom{xx} O \end{array} \right]_r$$

and (2)
$$\left[ \begin{array}{c} R'OOC \diagdown \diagup COOR^6 \\ R \\ -NH-C \diagup \diagdown C-NH-R''- \\ \parallel \phantom{xx} \parallel \\ O \phantom{xx} O \end{array} \right]_s$$

where the arrows denote isomerism; R is a radical selected from the group consisting of

[aromatic ring structures]

and

[aromatic ring structure with $R^2$]

where $R^2$ is selected from the group consisting of an alkylene chain having 1–3 carbon atoms, $$-O-, -S-, -SO_2-, -\overset{O}{\underset{\parallel}{C}}-, -\overset{O}{\underset{\parallel}{C}}-O-$$

$$-\overset{R^3}{\underset{R^3}{N}}-, -\overset{R^3}{\underset{R^4}{Si}}-, -O-\overset{R^3}{\underset{R^4}{Si}}-O-$$

$$-\overset{R^3}{\underset{\underset{\parallel}{O}}{P}}- \quad \text{and} \quad -O-\overset{R^3}{\underset{\underset{\parallel}{O}}{P}}-O-$$

where $R^3$ and $R^4$ are selected from the group consisting of alkyl and aryl and substiutted groups thereof; $R^1$ is a radical selected from the group consisting of

[aromatic ring structures]

and

[aromatic ring structure with $R^2$]

where $R^2$ has the same meaning as above; $R^5$ and $R^6$ are selected from the group consisting of H, lower alkyl and aryl; $R''$ is selected from the group consisting of $$-B-NH-(CH_2)_n-A-(CH_2)_n-NH-B-$$

and $-D_m-A-E-A-D_m-$ where A is arylene; B is selected from the group consisting of alkylene of 2 through 4 carbons and phenylene; D is alkylene of 1 through 4 carbon carbons; E is selected from the group consisting of $$-\overset{O}{\underset{\parallel}{C}}-NH-, \quad -\overset{O}{\underset{\parallel}{C}}-NH-CH_2-, \quad -(CH_2)_n-NH-(CH_2)_n-$$

and $$-(CH_3)_n-NH-\overset{O}{\underset{\parallel}{C}}-A-\overset{O}{\underset{\parallel}{C}}-NH-(CH_2)_n-$$

where A has the same meaning as above; and r is the integer 0, 1 or greater; s is at least 1 and is sufficient to provide at least one such recurring unit of the designated formula per 30 total units of the formulas designated by r and s; the sum of r plus s in the polymer being sufficient that the polymer has an inherent viscosity of at least 0.1 as measured at 30° C. on a 0.5% by weight solution in concentrated sulfuric acid; and m and n are each the integers 0 or 1.

The polyimides which according to the present invention can advantageously be crosslinked are those which correspond to the above defined polyamide-acids and which contain the following recurring structural units:

(3)

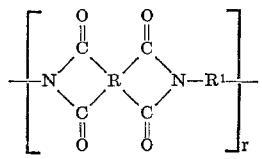

and (4)

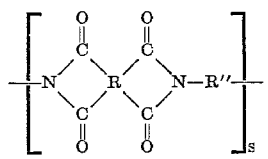

where each of the indicated symbols has the same meaning as above.

The above described polyamide-acid and polyimide polymers can be prepared by condensation polymerization procedures known in the art and described for example in Edwards United States Patent No. 3,179,614; Endrey United States Patent No. 3,179,630; Endrey United States Patent No. 3,179,633; and Edwards United States Patent No. 3,179,634; all issued Apr. 20, 1965, and particularly Lindsey & Locey United States patent application Ser. No. 468,140 filed June 29, 1965, now abandoned, and assigned to the assignee of the present application. The entire contents of the aforementioned patents and application are hereby incorporated herein by reference. Using the techniques described in the patent just mentioned, one or more aromatic tetracarboxylic acid dianhydrides or other reactive derivatives of the acid such as the tetraester, diester diacid halide, etc., is reacted with one or more organic primary diamines of structures such as to obtain the above defined polyamide-acid which may be converted to polyimide by thermal or chemical means or both, as described in those patents. Suitable dianhydrides and diamines are disclosed in the above-mentioned patents and patent application.

Besides the polyamide-acid route described above, the above-described polyimides suitable for crosslinking can also be prepared by the use of appropriately selected polyimide precursors other than polyamide-acids, such as polyisoimides according to procedures described in Angelo U.S. patent application Ser. No. 325,479 filed Nov. 21, 1963, now U.S. Patent No. 3,282,898; polyamide-esters according to procedures described in Angelo U.S. patent application Ser. No. 311,307 filed Sept. 25, 1963, now U.S. Patent No. 3,316,211; Angelo U.S. patent application Ser. No. 311,326 filed Sept. 25, 1963, now U.S. Patent No. 3,282,897; Sorenson U.S. patent application Ser. No. 288,535 filed June 17, 1963, now U.S. Patent No. 3,312,663; Tatum U.S. patent application Ser. No. 325,497 filed Nov. 21, 1963, now U.S. Patent No. 3,261,811; and Tocker U.S. patent application Ser. No. 332,889 filed Dec. 23, 1963, now U.S. Patent No. 3,326,851; and polyamide-amides according to procedures described in Angelo and Tatum U.S. patent application Ser. No. 325,442 filed Nov. 21, 1963, now U.S. Patent No. 3,316,212 which are all assigned to the assignee of the present application. The entire contents of the aforementioned patent applications and patents are hereby incorporated herein by reference.

Suitable diamines incorporated in structural units (2) and (4) above necessary to provide the required number of recurring units having the crosslinkable R" groups have the formulas $$H_2N-B-NH-(CH_2)_n-A-(CH_2)_n-NH-B-NH_2$$

and $$H_2N-D_m-A-E-A-D_m-NH_2$$

where each of the indicated symbols has the same meaning as indicated above. Illustrative of such suitable amines are: bis[4 - (N - beta - aminoethylaminomethyl)phenyl] ether; p-bis(N-p-aminophenylaminomethyl)benzene; 4-aminobenz-4-aminoanilide; 3-aminobenz-4-aminobenzylamide; bis(4-aminophenyl)amine; bis(4-aminobenzyl) amine; N,N'-bis(4-aminobenzyl)terephthalamide; bis[4-(N-delta-aminobutylaminomethyl)phenyl] sulfide; and N,N'-bis(gamma-aminopropyl)benzidine.

These diamines or mixtures thereof with organic primary diamines described in the aforementioned patents are reacted with the aromatic tetracarboxylic acid dianhydrides or derivatives thereof in the manner described in the aforementioned patents and patent application.

Suitable crosslinking agents for use in the present invention are those which react with two, three or four —NH— groups in the main polymer chains, as provided by the R" portions, to form a bridge which can be represented by the formula

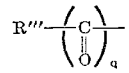

where $q$ is 2, 3 or 4. This radical replaces $q$ hydrogens of the —NH— groups in R". The R''' group in this formula is a di-, tri-, or tetravalent radical containing from about 2 through 20 carbon atoms. The group can be aliphatic, alicyclic, aromatic, heterocyclic, mixed aliphatic-aromatic, etc. Preferably, the R''' nucleus (ignoring indicated valences) is of the same groups as shown for R above.

The crosslinked polymers of the present invention are obtained by reacting either of the polyamide-acid represented by structural Formulas 1 and 2 above or the polyimides represented by structural Formulas 3 and 4 above with a polyfunctional carboxylic acid crosslinking agent or derivative thereof. The crosslinking reaction is conducted by suitably reacting the materials as, for example, intimately mixing them together with or without solvent for a suitable amount of time to effect crosslinking of the polymers. The amount of cross-linking agent employed may range from as low as a few mole percent and up to 100 mole percent, based upon the amount of available secondary amino groups. The amount of crosslinking will depend on such factors as the incidence of available —NR— sites and the amount of crosslinking agent or agents used, both factors being determined by the nature of the effect desired. It will be convenient to use an amount of crosslinking agent substantially equivalent on a molar functional group basis to the amount of available —NH— groups in the polyamide-acid or polyimide polymer.

Representative useful crosslinking agents include the following acids as well as their derived lower alkyl and phenyl esters, acid chlorides, anhydrides, and derivatives of mixed functionality: succinic acid; adipic acid; sebacic acid; isophthalic acid; terephthalic acid; trimellitic acid; bibenzoic acid; bis(4-carboxyphenyl)ether; bis(4-carboxyphenyl) sulfide thiophene-2,5-dicarboxylic acid; pyridine-2,4-dicarboxylic acid; and benzene-1,3,5 - tricarboxylic acid.

In addition to the foregoing, the following tetra acids and their derivatives as indicated above can be used: pyromellitic acid; 2,3,6,7 - naphthalene tetracarboxylic acid; 3,3',4,4' - diphenyl tetracarboxylic acid; 1,2,5,6-naphthalene tetracarboxylic acid; 2,2',3,3'-diphenyl tetracarboxylic acid; 2,2 - bis(3,4 - dicarboxyphenyl) propane; bis(3,4-dicarboxyphenyl) sulfone; 3,4,9,10-perylene tetracarboxylic dianhydride; bis(3,4-dicarboxyphenyl) ether; ethylene tetracarboxylic acid; naphthalene-1,2,4,5-tetracarboxylic acid; naphthalene - 1,4,5,8 - tetracarboxylic acid; decahydronaphthalene-1,4,5,8-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene - 1,4,5,8 - tetracarboxylic acid; phenanthrene-1,8,9,10-tetracarboxylic acid; cyclopentane-1,2,3,4-tetracarboxylic acid; pyrrolidine - 2,3,4,5 - tetracarboxylic acid; pyrazine-2,3,5,6-tetracarboxylic acid; 2,2- bis(2,3-dicarboxyphenyl) propane; 1,1-bis(2,3-dicarboxyphenyl) ethane; 1,1-bis(3,4-dicarboxyphenyl) ethane; bis (2,3-dicarboxyphenyl) methane; bis(3,4-dicarboxyphenyl) methane; bis(2,3-dicarboxyphenyl) sulfone; benzene-1,2,3,4-tetracarboxylic acid; 1,2,3,4 - butane tetracarboxylic acid; thiophene - 2,3,4,5 - tetracarboxylic acid; 3,4,3',4'-benzophenone tetracarboxylic acid; 1,1,2,2 - ethane tetracarboxylic acid; 2,3,3',4'-benzophenone tetracarboxylic acid; bis(3,4-dicarboxyphenyl)sulfide; cyclohexane-1,2,4,5-tetracarboxylic acid; dimethylcyclobutane-1,2,3,4-tetracarboxylic acid; tricyclo[4,2,2,0$^{2.5}$]-dec-7-ene - 3,4,9,10-tetracarboxylic acid; etc., and mixtures thereof.

The crosslinked polymers of the present invention are obtained by reacting either of the polyamide-acid represented by structural Formulas 1 and 2 above or the polyimides represented by structural Formulas 3 and 4 above with a polyfunctional carboxylic acid crosslinking agent or derivative thereof. The crosslinking reaction is conducted by suitably reacting the materials as, for example, intimately mixing them together with or without solvent for a suitable amount of time to effect crosslinking of the polymers. The amount of crosslinking agent employed may range from as low as a few mole percent and up to 100 mole percent, based upon the amount of available secondary amino groups.

The crosslinked polyamide-acid polymers of the present invention as represented by structural Formulas 1 and 2 above are characterized by the following chemical structural organization:

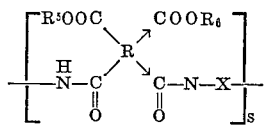

where X is selected from the group consisting of

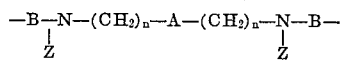

and

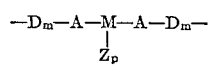

wherein Z is H or R'''

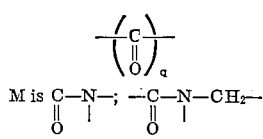

M is C—N—; —C—N—CH$_2$—
    ‖ |     ‖ |
    O       O and

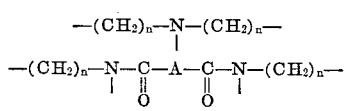

$p$ is 1 or 2; and A, B, D, R''', R$^5$, R$^6$, $m$, $q$ and $s$ have the same meaning as indicated hereinbefore.

The crosslinked polyimide polymer of the present invention as represented by structural Formulas 3 and 4 above are characterized by the following chemical structural organization:

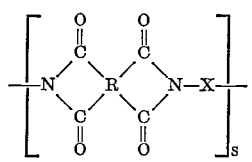

wherein X is as defined immediately hereinabove.

The crosslinking agent can be incorporated into the polyamide-acid polymer before or after the polymer is shaped, and before or after the polyamide-acid is converted partly or all to polyimide. Preferably, prior to conversion of the polyamide-acids of this invention into the polyimides, the solvent-soluble polyamide-acid will be coated onto any of various substrates, or formed into the desired shape such as a film, fiber, tube, etc. The substrates can be metals, inorganic materials such as glass, mica and asbestos, or organic polymers. Representative metals are copper, aluminum and steel. Glass and the organic polymers can be in the form of sheets, films, woven or non-woven fabrics, etc.

The resulting crosslinked polymers are useful as films, coatings, fibers, papers, wire enamels, impregnants and adhesives. They have excellent properties over a broad use-temperature range and provide an array of materials with a combination of density, and mechanical, electrical and thermal properties suitable for many such uses. The crosslinking of this invention is particularly useful in the adhesives industry, in which polyimides are finding their way, to permit application of high solids solutions of a workable viscosity which will readily wet the surfaces which are to be bonded together. By means of crosslinking, the adhesive becomes insoluble and less fusible at the temperature at which the bond is made. As a result the bond retains good strength but is no longer solvent-sensitive or fusible at functional temperatures.

The crosslinked polyimides are effective adhesives for polyimides, polyamides, metals, glass, asbestos, mica and the like, in any of their physical forms. Bonding is accomplished by coating or impregnating with a solution of the appropriate polyamide-acid, containing the crosslinking agent or agents. The heat required for thermal conversion of the polyamide-acid usually is sufficient to effect crosslinking. If not, additional heating can be used.

The invention will be further understood by reference to the following illustrative examples in which parts and percentages are by weight unless otherwise indicated.

EXAMPLE 1

A mixture of 0.1 mole ( 21.8 grams) of pyromellitic dianhydride was refluxed in 220 milliliters of absolute ethanol until solid material was no longer present. This resulted in the formation of a diethyl ester of pyromellitic acid. To 0.1 mole (31.4 grams) of bis(4-(N-beta-aminoethyl-aminomethyl) phenyl) ether this diester solution was added all at once with stirring under a blanket of nitrogen. After 30 minutes of additional stirring a heavy viscous oil was isolated by decanting off the ethanol. This oil was washed several times with alcohol to remove unreacted products and was then placed into a polymer tube and heated at 195° C. for 1.5 hours, then 240° C. for 3 hours. The resultant polymeric product was an amber-colored, somewhat brittle material. When pressed for 1 minute at 280° C. and 150 pounds per square inch between a piece of cold-rolled steel and a piece of film of the polypyromellitimide of bis(4-aminophenyl) ether which had been surface treated with polyethylenimine, a good bond was obtained. When a portion of this new polyimide was mixed intimately with 5% by weight of pyromellitic dianhydride crosslinking agent (an amount corresponding to 11 mole percent of the secondary amino groups present in the polymer) by grinding them together, and the resulting mixture was pressed between steel and polyimide film as described above, a tear seal of 1600 grams per inch was obtained. No delamination occurred when the laminate sample was bent 180°.

EXAMPLE 2

A mixture of 32.2 grams of 3,3',4,4'-benzophenone tetracarboxylic dianhydride in 300 milliliters of absolute ethanol was refluxed until solid was no longer visible. This solution was added to 31.4 grams of bis(4-(N-beta-amino-ethyl-aminomethyl) phenyl) ether by the procedure of Example 1. The extremely viscous oil formed from this reaction was separated from the ethanol and washed with three successive 75 milliliter portions of ethanol. Then 30 grams of this material was placed in a polymer tube and heated for 2 hours at 160° C. The material expanded about 30-fold and had an amber-colored, foam-like appearance.

EXAMPLE 3

Solid 3,3',4,4'-benzophenone tetracarboxylic dianhydride (16.1 grams) was added to an equimolar amount (15.7 grams) of bis(4-(N-beta-aminoethyl-aminomethyl)phenyl) ether dissolved in 220 milliliters of N,N-dimethylacetamide. A white solid precipitated from solution upon addition of the last portion of the dianhydride. The resultant solid was collected by filtration and washed with three successive 75 milliliter portions of ethanol. This material was allowed to air-dry at room temperature for about 72 hours. It was then placed into a polymer tube and heated at 160° C. for 3 hours. A dark tan-colored, rubbery material was obtained.

The foregoing examples can be repeated, as will be readily understood by persons skilled in this art, by substituting other materials within the indicated scope of this invention for those of the specific exemplifications.

It is to be understood that the foregoing detailed description is given merely by way of illustration and that many variations may be made therein without departing from the spirit or scope of this invention.

What is claimed is:

1. A crosslinked film and fiber forming polymer consisting essentially of recurring structural units of $$\left[ \begin{array}{c} R^5OOC \quad COOR^6 \\ \diagdown R \diagup \\ -NH-C \quad C-NH-R^1- \\ \parallel \quad \parallel \\ O \quad O \end{array} \right]_r$$

and $$\left[ \begin{array}{c} R^5OOC \quad COOR^6 \\ \diagdown R \diagup \\ -NH-C \quad C-NH-X- \\ \parallel \quad \parallel \\ O \quad O \end{array} \right]_s$$

where the arrows denote isomerism; R is a radical selected from the group consisting of

[structures shown]

and

[structure shown with $-R^2-$]

where $R^2$ is selected from the group consisting of an alkylene chain having 1–3 carbon atoms, $$-O-, -S-, -SO_2-, -\overset{O}{\underset{\parallel}{C}}-, -\overset{R^3}{\underset{\vert}{C}}-O-, -\overset{}{\underset{\vert}{N}}-,$$
$$\overset{R^3}{\underset{\vert}{\phantom{x}}}$$

$$-\overset{R_3}{\underset{\underset{R_4}{\vert}}{\overset{\vert}{Si}}}-, \; -O-\overset{R^3}{\underset{\underset{R^4}{\vert}}{\overset{\vert}{Si}}}-O-, \; -\overset{O}{\underset{\underset{O}{\parallel}}{\overset{\parallel}{P}}}-, \; \text{and} \; -O-\overset{R^3}{\underset{\underset{O}{\parallel}}{\overset{\vert}{P}}}-O$$

where $R^3$ and $R^4$ are selected from the group consisting of alkyl and aryl; $R^1$ is a radical selected from the group consisting of

[structures shown]

and

[structure shown with $-R^2-$]

where $R^2$ has the same meaning as above; $R^5$ and $R^6$ are selected from the group consisting of H, lower alkyl and aryl; X is selected from the group consisting of:

$$-B-N-(CH_2)_n-A-(CH_2)_n-N-B-$$
$$\phantom{xxx}\vert \phantom{xxxxxxxxxxxxxxxxxxxx} \vert$$
$$\phantom{xxx}Z \phantom{xxxxxxxxxxxxxxxxxxxx} Z$$

and $$-D_m-A-\underset{\underset{Z_p}{\vert}}{M}-A-D_m-$$

where A is arylene; B is selected from the group consisting of alkylene of 2 through 4 carbons and phenylene; D is alkylene of 1 through 4 carbons; Z is H or $$R'''-\left(\underset{\underset{O}{\parallel}}{\overset{}{C}}\right)_q-$$

M is $$-\overset{}{\underset{\underset{O}{\parallel}}{C}}-N-; \; -\overset{}{\underset{\underset{O}{\parallel}}{C}}-N-CH_2-; \; -(CH_2)_n-N-(CH_2)_n-$$

and $$-(CH_2)_n-N-\overset{}{\underset{\underset{O}{\parallel}}{C}}-A-\overset{}{\underset{\underset{O}{\parallel}}{C}}-N-(CH_2)_n-$$

and $r$ is the integer 0, 1 or greater; $s$ is at least 1 and is sufficient to provide at least 1 such recurring unit of the designated formula per 30 total units of the formulas designated by $r$ and $s$;

the sum of $r$ plus $s$ in the polymer being sufficient that the polymer has an inherent viscosity of at least 0.1 as measured at 30° C. on a 0.5% by weight solution in concentrated sulfuric acid; and $m$ and $n$ are each selected from the group consisting of 0 and 1; $R'''$ is selected from the group consisting of di-, tri-, and tetravalent aliphatic, alicyclic, aromatic and mixed aliphatic-aromatic radicals of 2 through 20 carbon atoms; and $q$ is a positive integer of 2 through 4.

2. A crosslinked film and fiber forming polymer consisting essentially of recurring structural units of $$\left[ \begin{array}{c} O \quad\quad O \\ \parallel \quad\quad \parallel \\ C \quad\quad C \\ \diagup \diagdown \; R \; \diagup \diagdown \\ N \quad\quad\quad\quad N-R^1 \\ \diagdown \diagup \quad\quad \diagdown \diagup \\ C \quad\quad C \\ \parallel \quad\quad \parallel \\ O \quad\quad O \end{array} \right]_r$$

and

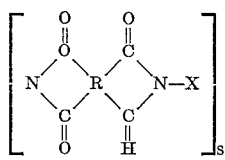

R is a radical selected from the group consisting of

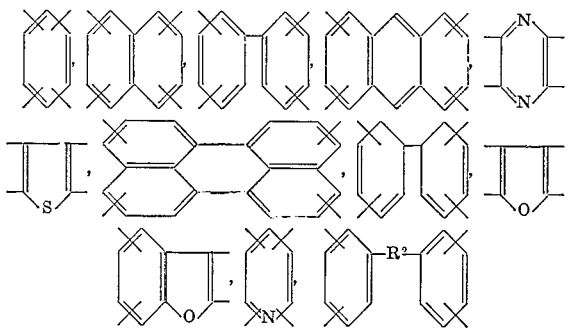

where $R^2$ is selected from the group consisting of an alkylene chain having 1–3 carbon atoms,

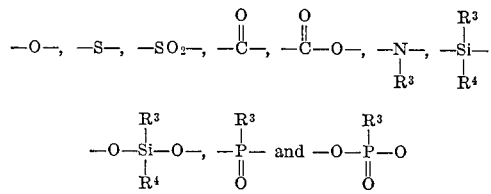

where $R^3$ and $R^4$ are selected from the group consisting of alkyl and aryl; $R_1$ is a radical selected from the group consisting of Z is H or

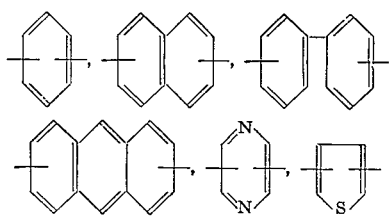

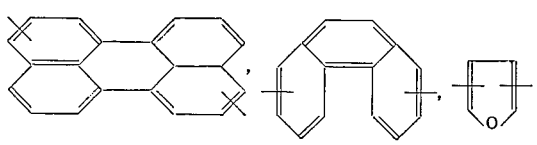

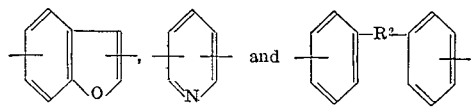

where $R^2$ has the same meaning as above; $R^5$ and $R^6$ are selected from the group consisting of H, lower alkyl and aryl; X is selected from the group consisting of

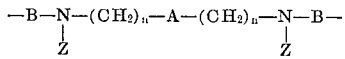

and

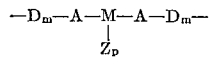

where A is arylene; B is selected from the group consisting of alkylene of 2 through 4 carbons and phenylene; D is alkylene of 1 through 4 carbons;

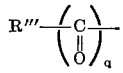

M is

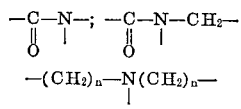

and

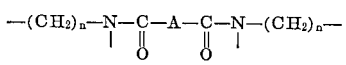

and $r$ is the integer 0,1 or greater; $s$ is at least 1 and is sufficient to provide at least one such recurring unit of the designated formula per 30 total units of the formulas designated by $r$ and $s$; the sum of $r$ plus $s$ in the polymer being sufficient that the polymer has an inherent viscosity of at least 0.1 as measured at 30° C. on a 0.5% by weight solution in concentrated sulfuric acid; and $m$ and $n$ are each selected from the group consisting of 0 and 1; $R'''$ is selected from the group consisting of di-, tri-, and tetravalent aliphatic, alicyclic, aromatic and mixed aliphatic-aromatic radicals of 2 through 20 carbon atoms; and $q$ is a positive integer of 2 through 4.

3. The crosslinked polymer as in claim 1 wherein $R'''$ is selected from the same group as R.

4. The crosslinked polymer as in claim 2 wherein $R'''$ is selected from the same group as R.

References Cited

UNITED STATES PATENTS

| | | | |
|---|---|---|---|
| 3,336,258 | 8/1967 | Angelo et al. | 260—47 |
| 3,416,994 | 12/1968 | Chalmers et al. | 161—227 |
| 3,423,365 | 1/1969 | Hoegger | 260—65 |

WILLIAM H. SHORT, Primary Examiner

L. L. LEE, Assistant Examiner

U.S. Cl. X.R.

117—124, 126, 132, 138.8; 161—197, 205, 214; 260—32.6, 33.4, 65, 78, 78.4

PO-1050
(5/69)

UNITED STATES PATENT OFFICE
CERTIFICATE OF CORRECTION

Patent No. 3,492,270     Dated  January 27, 1970

Inventor(s) Darrell J. Parish

It is certified that error appears in the above-identified patent and that said Letters Patent are hereby corrected as shown below:

Column 1, lines 63-68, the structural formula reading

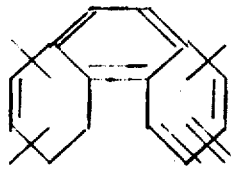   should read   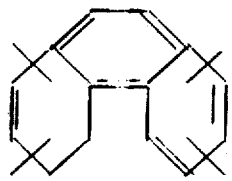

Column 2, line 52, cancel first occurrence of "carbon". Colu 4, line 43, symbol reading "-NR-" should read -- -NH- --. Colu 5, line 30, "$R_6$" in the structural formula should read -- $R^6$ -- line 33, "-N-X-" in the structural formula should read -- -N(H)-X- --; lines 36-37, that portion of the formula reading "-B-N-" with Z should read -- -B-N- with Z --; line 49, cancel "and"; line ! before the formula add -- and --. Column 7, line 67, the structural formula reading

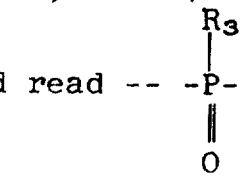 "-C-O" should read --  -C-O- --; lines 70-74, the structural formula reading 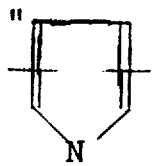 "-P-" should read -- 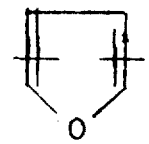 -P- --. Column 8, lines 17-21, the formula reading "(N ring)" should read -- (O ring) --

UNITED STATES PATENT OFFICE
CERTIFICATE OF CORRECTION

Patent No. 3,492,270　　　　Dated January 27, 1970

Inventor(s) Darrell J. Parish　　　PAGE - 2

It is certified that error appears in the above-identified patent and that said Letters Patent are hereby corrected as shown below:

- page 2 -

Column 9, lines 1-8, that portion of the structural formula reading "$\begin{matrix}\diagdown\!\!\diagup\\ C\\ \|\\ H\end{matrix}$" should read -- $\begin{matrix}\diagdown\!\!\diagup\\ C\\ \|\\ O\end{matrix}$ --; line 36, cancel the expression reading "Z is H or". Column 10, line 13, add after "carbons;" -- Z is H or --; the formula reading "$-(CH_2)_n-N(CH_2)_n-$" should read -- $-(CH_2)_n-N-(CH_2)_n-$ --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents